United States Patent
Chou

(10) Patent No.: US 8,437,804 B2
(45) Date of Patent: May 7, 2013

(54) MOBILE PHONE AND DIALING METHOD THEREOF

(75) Inventor: Fu-Chiang Chou, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 440 days.

(21) Appl. No.: 12/344,274

(22) Filed: Dec. 25, 2008

(65) Prior Publication Data

US 2009/0170561 A1 Jul. 2, 2009

(30) Foreign Application Priority Data

Dec. 31, 2007 (TW) ................................ 96151568 A

(51) Int. Cl.
*H04M 1/26* (2006.01)
*G10L 15/00* (2006.01)

(52) U.S. Cl.
USPC ......................................... 455/563; 704/275

(58) Field of Classification Search .................. 455/563, 455/569.1; 379/420.01, 420.02, 420.03; 704/270, 275

See application file for complete search history.

(56) References Cited

U.S. PATENT DOCUMENTS

| | | | | |
|---|---|---|---|---|
| 5,175,759 | A * | 12/1992 | Metroka et al. | 455/569.1 |
| 5,335,276 | A * | 8/1994 | Thompson et al. | 380/266 |
| 6,012,030 | A * | 1/2000 | French-St. George et al. | 704/275 |
| 6,198,947 | B1 * | 3/2001 | Barber | 455/563 |
| 6,493,670 | B1 * | 12/2002 | Croft | 704/270 |
| 6,505,159 | B1 * | 1/2003 | Theodore | 704/270 |
| 7,496,693 | B2 * | 2/2009 | Cook et al. | 455/563 |
| 2003/0109286 | A1 | 6/2003 | Hack et al. | |
| 2008/0242343 | A1 * | 10/2008 | Koh et al. | 455/550.1 |

FOREIGN PATENT DOCUMENTS

CN 1639991 7/2005

OTHER PUBLICATIONS

"Search Report of European counterpart application", issued on Apr. 14, 2009, p1-p7.

* cited by examiner

*Primary Examiner* — Howard Williams
(74) *Attorney, Agent, or Firm* — Jianq Chyun IP Office

(57) ABSTRACT

A dialing method of a mobile phone having no physical keyboard is provided. The dialing method includes the following steps. Firstly, a dialing instruction is enabled. Then, a virtual keyboard and a voice recognition module are enabled according to the dialing instruction, so as to receive an input datum from a user. Further, the mobile phone performs a dialing function selected by the user.

11 Claims, 4 Drawing Sheets

MOBILE PHONE AND DIALING METHOD THEREOF

CROSS-REFERENCE TO RELATED APPLICATION

This application claims the priority benefit of Taiwan application serial no. 96151568, filed on Dec. 31, 2007. The entirety of the above-mentioned patent application is hereby incorporated by reference herein and made a part of specification.

BACKGROUND OF THE INVENTION

1. Technical Field

The application relates to a dialing method of a telephone and more particularly to a dialing method of a mobile phone without physical keyboard.

2. Description of Related Art

As electronic technology rapidly advances, consumptive electronic appliances are becoming a part of the modern life, and portable electronic products with varied functions are being developed correspondingly. For the purpose of convenience, more portable electronic products which are further integrated with multiple functions have been brought forth to the consumers. A PDA (personal digital assistant) mobile phone, one of the most commonly-used electronic devices, is a mobile phone having the functions of a PDA.

In comparison with the traditional mobile phone, the PDA mobile phone requires a larger display screen for the user to utilize the functions of PDA easily. To dispose the large-sized display screen, it would be ideal to omit all the buttons, including the keyboard, from the PDA mobile phone. For this reason, the technology of virtual keyboard has been applied on the conventional PDA mobile phone to replace the traditional keyboard. The virtual keyboard is displayed as an image on the screen of the mobile phone and is shown only when the user requires the keyboard and presses the dial button. Thus, the space on the mobile phone is effectively saved.

In addition, voice control dialing is another convenient function of mobile phones. However, in the conventional mobile phones, voice control functions are mostly designed as an individual program. Therefore, the user is required to press a voice control dial button for activating the function of voice control dialing. Moreover, in order to dial, a keyboard activating button also needs to be pressed so as to enable the virtual keyboard, which complicates the process of operating the mobile phone. When dialing, the user usually presses the keyboard directly without considering pressing an additional activating button to enable the function of voice control dialing. As a consequence, the function of voice control dialing is hardly used. To increase the use of voice control dialing, a more direct and convenient voice control dialing method is therefore required.

SUMMARY OF THE INVENTION

The application provides a dialing method of a mobile phone, which enables keyboard dialing and voice control dialing functions by utilizing a dialing instruction only.

The application provides a dialing method of a mobile phone, which enables keyboard dialing and voice control dialing functions when a dial button is pressed for dialing.

The application provides a dialing device of a mobile phone, which enables keyboard dialing and voice control dialing functions by utilizing the same dial button.

The application provides a dialing device of a mobile phone, which enables keyboard dialing and voice control dialing functions when a dial button is pressed for dialing.

The application provides a dialing method of a mobile phone, comprising the following steps: waiting for a dialing instruction, and enabling a virtual keyboard and a voice recognition module according to the dialing instruction after the dialing instruction is provided. The virtual keyboard and the voice recognition module are used for receiving an input datum. Moreover, the virtual keyboard is displayed on a display screen of the mobile phone. Then, a dialing function is performed according to the input datum.

In an embodiment of the present invention, the step of enabling the dialing instruction of the aforementioned method comprises enabling the dialing instruction by a dial button.

In an embodiment of the present invention, the step of enabling the dialing instruction of the aforementioned method comprises enabling the dialing instruction by a virtual button.

In an embodiment of the present invention, a sequence of enabling the virtual keyboard and the voice recognition module comprises enabling the virtual keyboard and the voice recognition module simultaneously, or enabling the virtual keyboard before enabling the voice recognition module, or enabling the voice recognition module before enabling the virtual keyboard.

In an embodiment of the present invention, the input datum comprises a voice control datum or a keyboard datum.

In an embodiment of the present invention, the step of enabling the virtual keyboard and the voice recognition module according to the dialing instruction for receiving the input datum further comprises counting a predetermined time. If the voice control datum is received within the predetermined time, the dialing function is performed according to the voice control datum. If the keyboard datum is received within the predetermined time, the voice recognition module is disabled and the dialing function is performed according to the keyboard datum. In addition, the voice recognition module is disabled when the predetermined time is over.

In the dialing method of an embodiment of the present invention, the step of performing the dialing function according to the voice control datum if the voice control datum is received in the predetermined time further comprises acquiring a telephone number corresponding to the voice control datum from a phone book for dialing.

In an embodiment of the present invention, the step of enabling the virtual keyboard and the voice recognition module according to the dialing instruction further comprises displaying a voice control icon.

In an embodiment of the present invention, the step of enabling the virtual keyboard and the voice recognition module according to the dialing instruction further comprises playing a reminder sound for the voice control dialing function.

In an embodiment of the present invention, the mobile phone does not include any physical keyboard.

The present invention provides a mobile phone, which includes a touch screen, a voice recognition module, an input module, and a calculation unit, wherein the voice recognition module is used for recognizing voices, the input module comprises a voice receiving element and at least a dial button, the calculation unit is coupled to the touch screen and the input module for performing dialing function. Moreover, when the input module receives the dialing instruction, the calculation unit displays the virtual keyboard on the touch screen and enables the voice recognition module for receiving the input datum. The dialing function is then performed according to the input datum.

In an embodiment of the present invention, the dialing instruction is enabled when the dial button of the mobile phone is pressed.

In an embodiment of the present invention, the dial button of the mobile phone is a physical button or a virtual button.

In an embodiment of the present invention, the input datum is a voice control datum or a keyboard datum.

In an embodiment of the present invention, the mobile phone starts counting the predetermined time after the calculation unit displays the virtual keyboard and the voice recognition module. Within the predetermined time, if the voice control datum is received, the mobile phone performs dialing function according to the voice control datum; if the keyboard datum is received, the voice recognition module is disabled and the dialing function is performed according to the keyboard datum. In addition, the voice recognition module is disabled when the predetermined time is over.

In an embodiment of the present invention, the calculation unit further displays a voice control icon on the touch screen when the input module receives the dialing instruction.

In an embodiment of the present invention, the calculation unit further plays a reminder sound for the voice control dialing function when the input module receives the dialing instruction.

In an embodiment of the present invention, the mobile phone does not include any physical keyboard.

The application provides the mobile phone and dialing method which require merely one dialing instruction to activate voice control dialing and keyboard dialing functions, and thereby omits elements (such as a voice control activating button) which are necessary to a mobile phone without physical keyboard. The production costs are therefore reduced and the interface becomes more simple and convenient to use.

To make the above features and advantages of the application more comprehensible, several embodiments accompanied with drawings are described in detail as follows.

BRIEF DESCRIPTION OF THE DRAWINGS

The accompanying drawings are included to provide a further understanding of the application, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
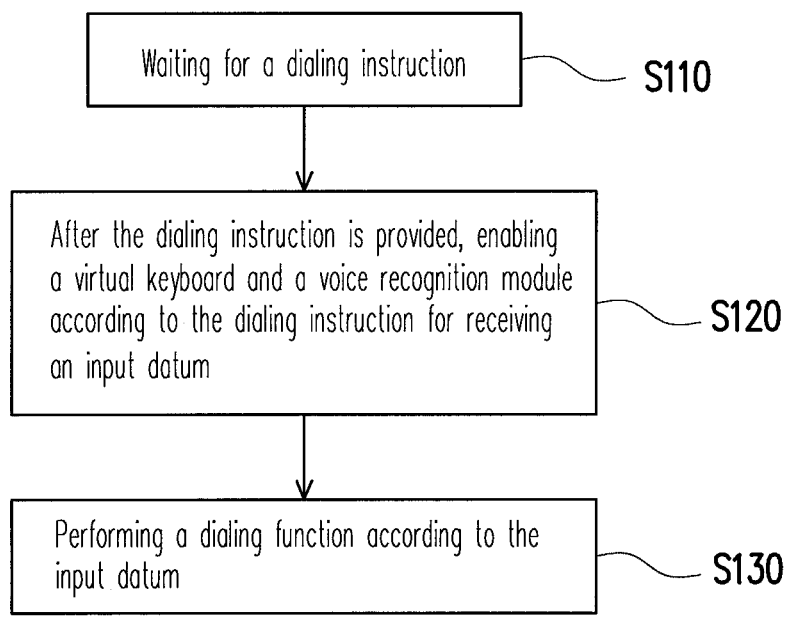
FIG. 1 illustrates a dialing method of a mobile phone according to an embodiment of the present invention.

Referring to FIG. 1, FIG. 1 is a flowchart of a dialing method of a mobile phone according to the first embodiment of the present invention. The dialing method according to this embodiment includes the following steps: firstly, a dialing instruction is enabled (S110). The step of enabling the dialing instruction may be completed by a preceding operation made to the mobile phone before dialing, such as pressing a dial button disposed on the mobile phone, touching a virtual button displayed on a display screen, pushing or lifting open a front cover of the mobile phone, and so forth. Then, the mobile phone enables a virtual keyboard and a voice recognition module according to the dialing instruction. The virtual keyboard receives an input datum when pressed by a user. The voice recognition module receives the user's voice as the input datum. Certainly, the virtual keyboard is displayed on the display screen of the mobile phone (S120).

It should be noted that the sequence of enabling the virtual keyboard and the voice recognition module is not restricted. For instance, the virtual keyboard and the voice recognition module may be simultaneously enabled, or the virtual keyboard may be enabled before the voice recognition module, or the voice recognition module may be enabled before the virtual keyboard.

Following the aforementioned steps, dialing function is performed corresponding to the input datum received by the virtual keyboard or the voice recognition module (S130). If the input datum is received by the virtual keyboard, the keyboard dialing function is performed; if the input datum is received by the voice recognition module, the voice control dialing function is performed.

Figure 2:
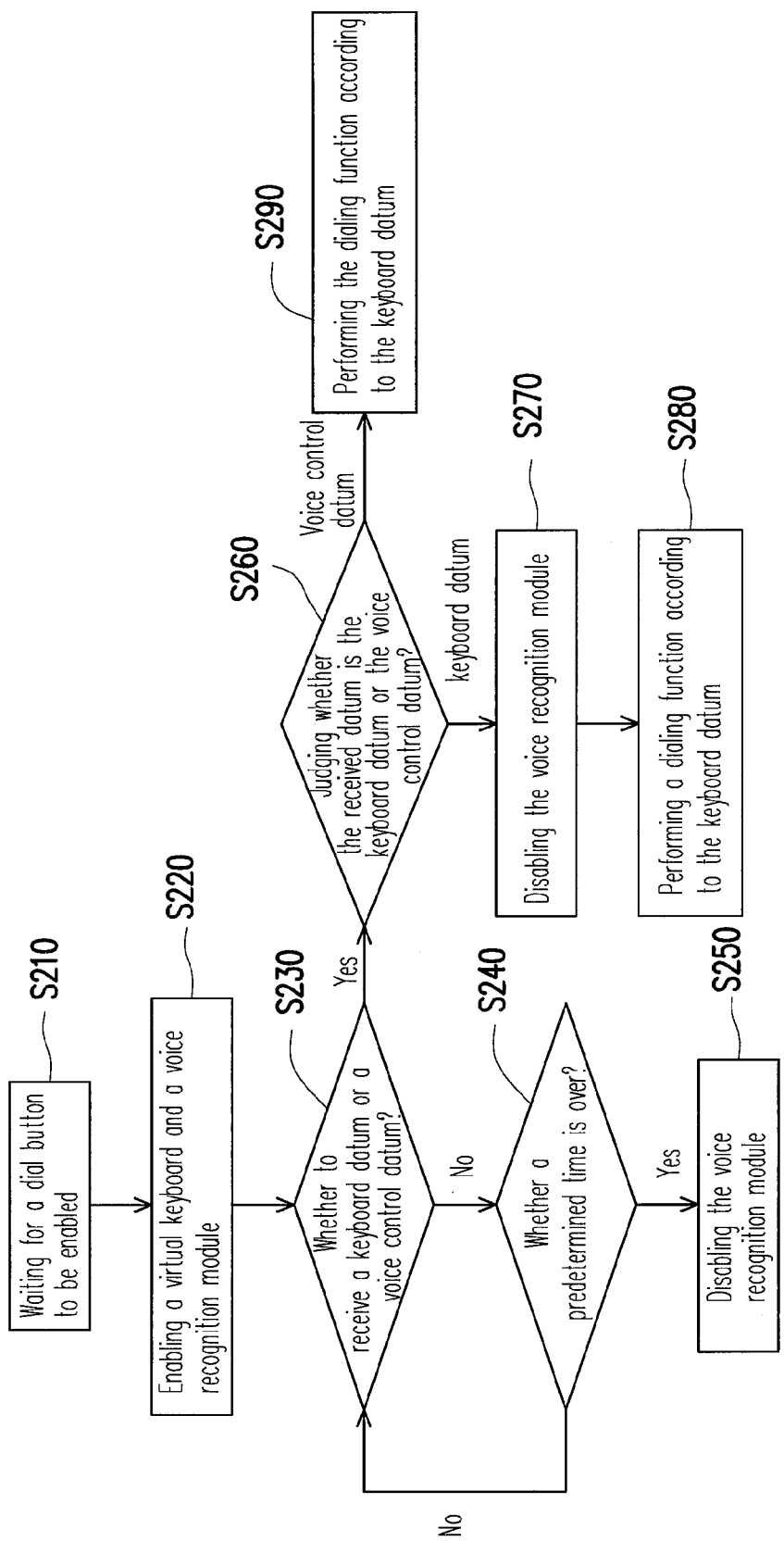
FIG. 2 illustrates a dialing method of a mobile phone according to another embodiment of the present invention.

To make the application more comprehensible to persons having ordinary skill in the art, a flowchart is further provided for illustrating the technical feature of this embodiment. Referring to FIG. 2, FIG. 2 is a flowchart illustrating the dialing method in FIG. 1.

Herein, Step S110, i.e. waiting for the dialing instruction in FIG. 1, is to the process of Step S210, i.e. waiting for the user to press the dial button for enabling dialing function. The foregoing dial button comprises a physical button disposed on the mobile phone or a virtual button displayed on the touch screen. Then, the virtual keyboard and the voice recognition module are enabled (S220) to wait for the input datum from the user. Next, determine whether the input datum is received (S230). If the mobile phone determines that no input datum is received, the mobile phone further determines whether the time from Step S220 to Step S230 exceeds the predetermined time (S240). If the predetermined time is over, the voice recognition module is closed and disabled (S250). On the contrary, if the predetermined time is not over, the voice recognition module remains waiting for data input.

Once a datum is inputted, determine the type of the datum received is. The determining process is to determine whether the received datum is the keyboard datum received by the virtual keyboard or the voice control datum received by the voice recognition module (S260). If the input datum is the keyboard datum, the voice recognition module is closed and disabled (S270), and the dialing function is performed according to the keyboard datum, i.e. dialing the numbers inputted via keyboard by the user (S280). On the contrary, if the input datum is the voice control datum, the dialing function is performed according to the voice control datum (S290).

Second Embodiment

Figure 3:
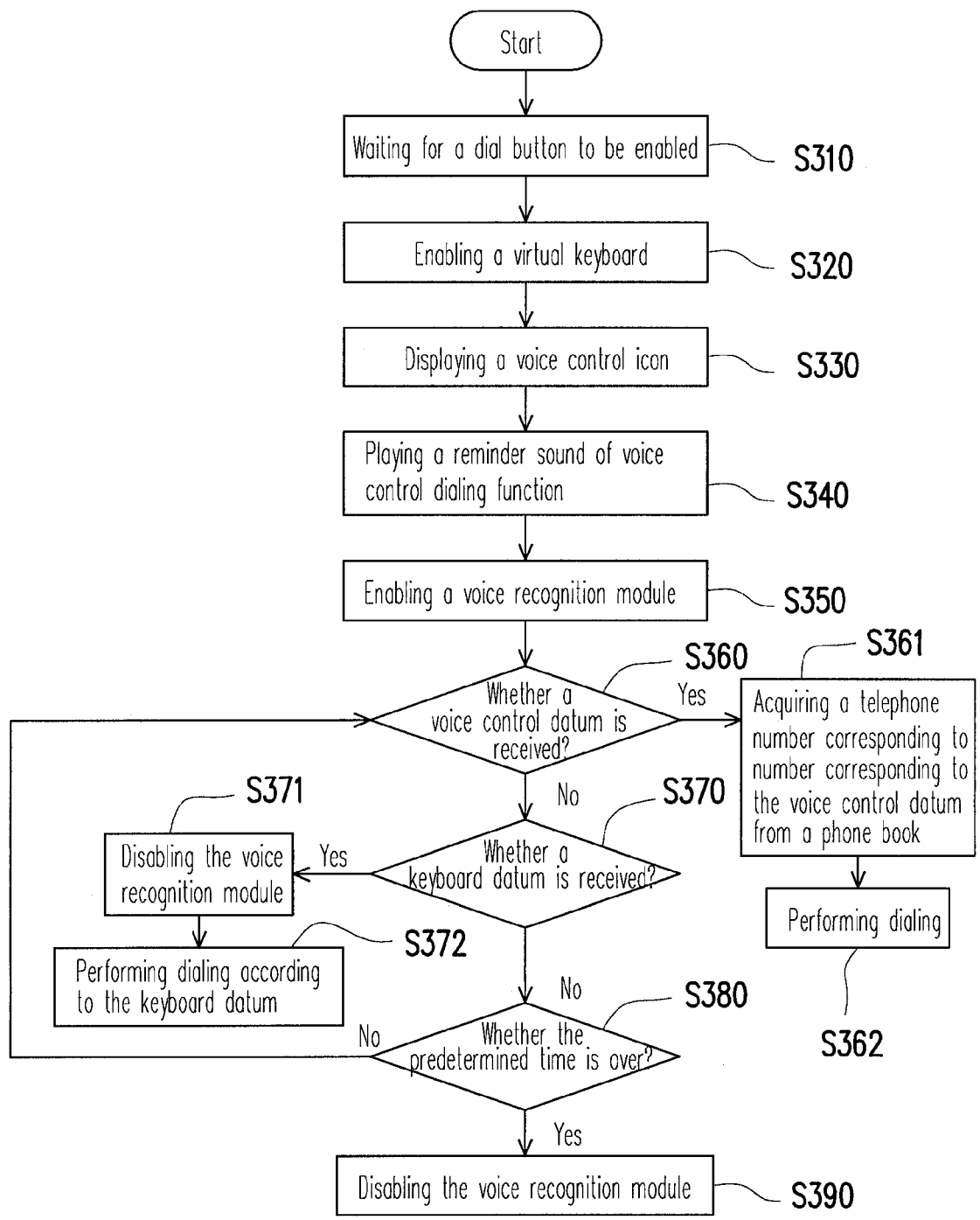
FIG. 3 is a flowchart of a dialing method of a mobile phone according to the second embodiment of the present invention.

When applied in practice, mobile phones are usually integrated with user-friendly functions, such as audio or icon reminders, so as to facilitate the use of the user. Referring to FIG. 3, FIG. 3 is a flowchart of a dialing method of a mobile phone according to the second embodiment of the present invention.

In the second embodiment, after the dial button of the mobile phone is enabled (S310), the mobile phone directly shows the virtual keyboard on the touch screen (S320), and displays the voice control icon (S330), plays a reminder sound for voice control dialing function (S340), and enables the voice recognition module (S350). It should be noted that the sequence of the aforementioned Steps S320~S350 is not restricted to the above. Basically the four steps are performed sequentially, and the user may feel that these steps take place at the same time. The sequence of steps as shown in FIG. 3 is for reference only, and the application of the present invention is not limited thereto.

Following the aforementioned steps, the mobile phone determines the type of the input datum after the input datum is received by the voice recognition module or the virtual keyboard. If the received input datum is the voice control datum (S360), the mobile phone acquires a telephone number corresponding to the voice control datum from a phone book (S361) and performs dialing (S362). If the input datum is the keyboard datum instead of the voice control datum (S370), the mobile phone closes the voice recognition module (S371) and performs dialing according to the keyboard datum (S380). Furthermore, if no input datum is received and an idle time of the mobile phone exceeds the predetermined time, the mobile phone determines that the user does not use the voice control dialing function. Accordingly, the voice recognition module is closed and disabled (S390). In the meantime, the user may use the virtual keyboard for dialing or other operations.

Third Embodiment

Figure 4:
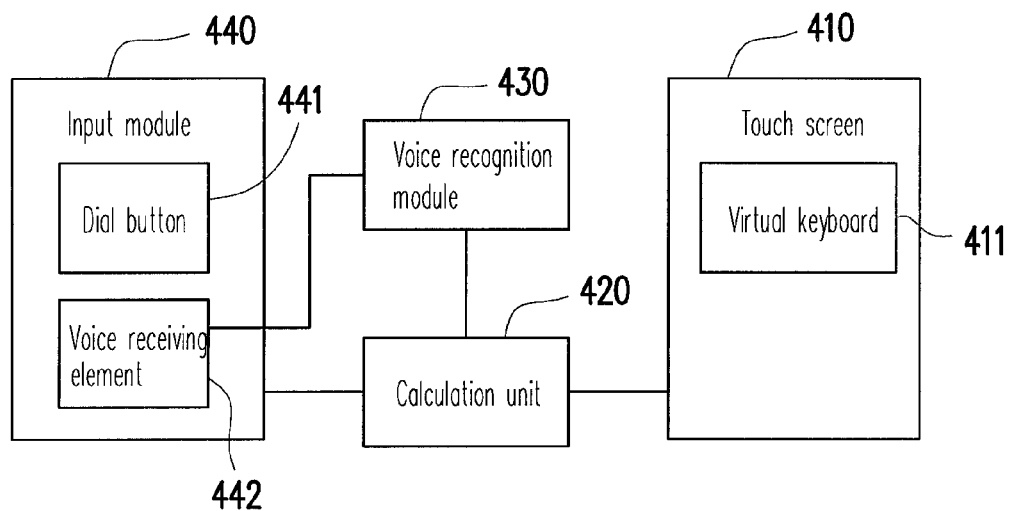
FIG. 4 illustrates a functional diagram of a mobile phone device according to the third embodiment of the present invention.

Referring to FIG. 4, FIG. 4 illustrates a functional diagram of a mobile phone device according to the third embodiment of the present invention. In this embodiment, a mobile phone 400 comprises a touch screen 410, a calculation unit 420, a voice recognition module 430, and an input module 440. The input module 440 comprises a voice receiving element 442 and at least a dial button 441.

When the user presses the dial button 441, the input module receives a dialing instruction and informs the calculation unit 420 of the dialing instruction. The calculation unit 420 displays a virtual keyboard 411 on the touch screen 410 and enables the voice recognition module 430 for receiving data inputted by the user. In addition, to remind the user that the voice control dialing function has been activated, the mobile phone 400 also displays a voice control icon and plays a reminder sound of voice control dialing. Certainly, these two functions may be set to be disabled or enabled according to the user's preference.

The calculation unit 420 starts counting a predetermined time after displaying the virtual keyboard 411 and enabling the voice recognition module 430. Within the predetermined time, if the voice control datum is received, the mobile phone performs dialing function according to the voice control datum; if the keyboard datum is received, the voice recognition module is disabled and the dialing function is performed according to the keyboard datum; and if the predetermined time is over, the voice recognition module is disabled.

It should be noted that the dial button 441 as described in this embodiment is not necessarily a physical button on the mobile phone 400 and may also be a virtual button displayed on the touch screen. That is to say, any forms of devices that are used for enabling the dialing instruction all fall within the scope of technical feature of the dial button in the present invention.

To make the application more comprehensible to persons having ordinary skill in the art, a schematic view of a mobile phone is given as an example for illustrating the main technical solution shown in FIG. 4.

Figure 5:
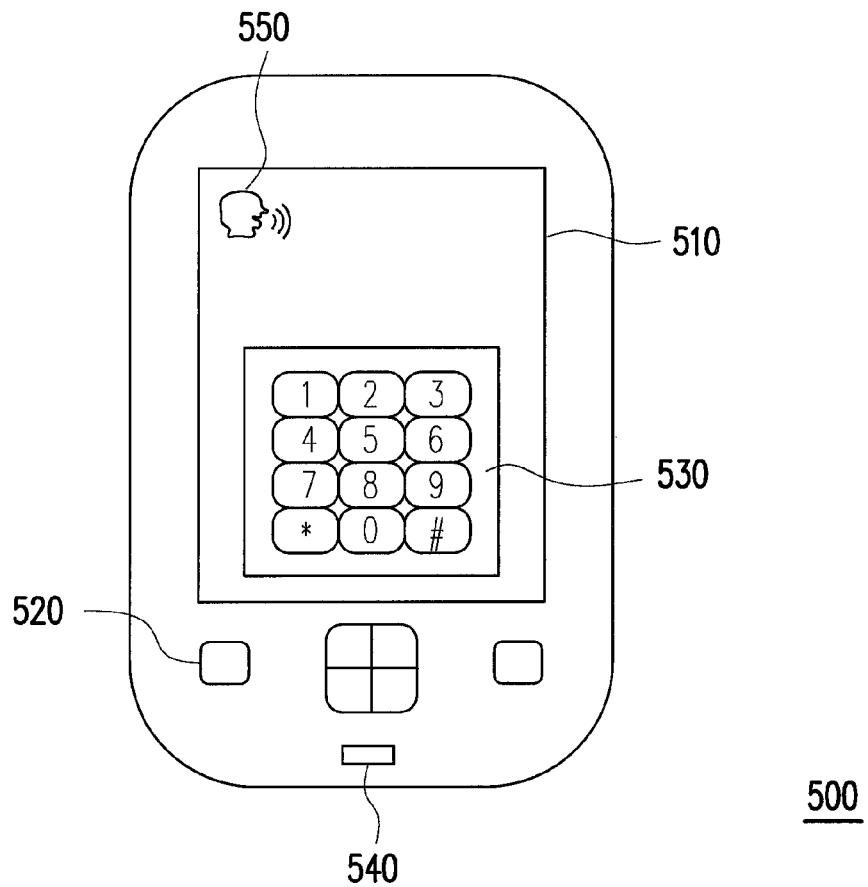
FIG. 5 is a schematic view of the mobile phone according to the third embodiment of the present invention.

Referring to FIG. 5, FIG. 5 is a schematic view of the mobile phone in the third embodiment of the present invention. A mobile phone 500 comprises a calculation unit (not shown), a dial button 520, a voice receiving element 540 (such as a microphone), and a touch screen 510. When the user presses the dial button 520, the touch screen 510 displays a virtual keyboard 530 and a voice control icon 550. If a function of audio reminder is set, the mobile phone 500 would also play a reminder sound of voice control dialing. In the meantime, the user may select to dial by utilizing the virtual keyboard or the voice control dialing function without pressing any additional button to enable the voice control dialing function.

In conclusion, the application uses one single dialing instruction (pressing the dial button, for example) to simultaneously activate the voice control dialing and keyboard dialing functions, and is able to automatically determine the dialing method selected by the user. According to the application, activating buttons for respectively enabling the voice control dialing and the keyboard dialing functions are not required, and therefore can be omitted. Moreover, the dialing method is simplified. Better user interface is provided, and the production costs are reduced effectively. Furthermore, the application is particularly applicable to PDA mobile phones is without physical keyboards to make easy the use of voice control dialing and virtual keyboard dialing functions.

Although the application has been disclosed by the above embodiments, they are not intended to limit the application. Any person having ordinary knowledge in the art may make some modifications and alterations without departing from the spirit and scope of the application. Therefore, the scope for which protection is sought by the application falls in the appended claims.

What is claimed is:

1. A dialing method of a mobile phone with a touch screen having neither a physical dialing keyboard nor a front cover, comprising:
    waiting for receiving a dialing instruction, which is provided only by pressing a virtual dial button, instead of only opening a front cover of the mobile phone, wherein the dialing instruction still remains not activated until the virtual dial button is pressed;
    simultaneously activating, in response to the dialing instruction, both a virtual keyboard function for receiving a keyboard datum and a voice recognition module ready for receiving a keyboard datum or a voice control datum, and
    performing the dialing function according to a voice control datum if the voice control datum is received within a predetermined time period;
    disabling the voice recognition module and performing the dialing function according to a keyboard datum if the keyboard datum is received within the predetermined time period; and
    disabling the voice recognition module when the predetermined time period is over.

2. The dialing method as claimed in claim 1, wherein, after the step of performing the dialing function according to the voice control datum if the input datum received within the predetermined time period is the voice control datum, the dialing method further comprises:
    acquiring a telephone number corresponding to the voice control datum from a phone book and performing dialing.

3. The dialing method as claimed in claim 1, wherein the step of activating the virtual keyboard function and the voice recognition module according to the dialing instruction after the dialing instruction is provided further comprises displaying a voice control icon.

4. The dialing method as claimed in claim 1, wherein the step of activating the virtual keyboard function and the voice recognition module according to the dialing instruction after the dialing instruction is provided further comprises playing a reminder sound of voice control dialing function.

5. A mobile phone, comprising:
a touch screen;
a voice recognition module for recognizing a voice;
an input module comprising a voice receiving element and at least a virtual dial button displayed on the touch screen to receive an input of a dialing instruction, which is provided only by pressing the virtual dial button, wherein the dialing instruction still remains not activated until the virtual dial button is pressed; and
a calculation unit coupled to the touch screen and the input module for performing a dialing function;
wherein when the input module receives the dialing instruction, the calculation unit is configured simultaneously to control the touch screen to display a virtual keyboard and to enable said voice recognition module for receiving an input datum, and then the calculation unit is further configured to execute the dialing function according to the input datum;
wherein the calculation unit is configured to start counting a predetermined time period after displaying the virtual keyboard and the voice recognition module; within the predetermined time, if a voice control datum is received, the dialing function is performed according to the voice control datum; if a keyboard datum is received, the voice recognition module is disabled and the dialing function is performed according to the keyboard datum; and if the predetermined time period is over, the voice recognition module is disabled; and
wherein the mobile phone has neither a physical dialing keyboard nor a front cover.

6. The mobile phone as claimed in claim 5, wherein the calculation unit is further configured to display a voice control icon on the touch screen when the input module receives the dialing instruction.

7. The mobile phone as claimed in claim 5, wherein the calculation unit further plays a reminder sound of voice control dialing function when the input module receives the dialing instruction.

8. A dialing method of a mobile phone, comprising:
waiting for a virtual dial button to be enabled, only by pressing the virtual dial button, wherein a dialing instruction still remains not activated until the virtual dial button is pressed;
simultaneously activating, in response to the virtual dial button enabled, both a virtual keyboard function for receiving a keyboard datum and a voice recognition module for receiving a voice control datum if the virtual dial button is enabled;
performing a dialing function according to the voice control datum if the voice control datum is received within a predetermined time period;
disabling the voice recognition module and performing the dialing function according to the keyboard datum if the keyboard datum is received within the predetermined time period; and
disabling the voice recognition module when the predetermined time period is over,
wherein the mobile phone has a touch screen and neither a physical dialing keyboard nor a front cover.

9. The dialing method as claimed in claim 8, wherein the step of performing the dialing function according to the voice control datum if the voice control datum is received within the predetermined time period further comprises:
acquiring a telephone number corresponding to the voice control datum from a phone book and performing the dialing function.

10. The dialing method as claimed in claim 8, wherein the step of activating, in response to the virtual dial button enabled, both a virtual keyboard function for receiving a keyboard datum and a voice recognition module for receiving a voice control datum further comprises displaying a voice control icon.

11. The dialing method as claimed in claim 8, wherein the step of activating, in response to the virtual dial button enabled, both a virtual keyboard function for receiving a keyboard datum and a voice recognition module for receiving a voice control datum further comprises playing a reminder sound of voice control dialing function.

* * * * *